US010013286B2

(12) United States Patent
Chen et al.

(10) Patent No.: US 10,013,286 B2
(45) Date of Patent: Jul. 3, 2018

(54) METHOD FOR DEPLOYING STORAGE SYSTEM RESOURCES WITH LEARNING OF WORKLOADS APPLIED THERETO

(71) Applicant: ProphetStor Data Services, Inc., Taichung (TW)

(72) Inventors: Wen Shyen Chen, Taichung (TW); Ming Jen Huang, Taichung (TW)

(73) Assignee: Prophetstor Data Services, Inc., Taichung (TW)

( * ) Notice: Subject to any disclaimer, the term of this patent is extended or adjusted under 35 U.S.C. 154(b) by 164 days.

(21) Appl. No.: 15/051,819

(22) Filed: Feb. 24, 2016

(65) Prior Publication Data
US 2017/0242729 A1    Aug. 24, 2017

(51) Int. Cl.
*G06F 9/50* (2006.01)
*G06N 99/00* (2010.01)

(52) U.S. Cl.
CPC .............. *G06F 9/50* (2013.01); *G06N 99/005* (2013.01)

(58) Field of Classification Search
None
See application file for complete search history.

(56) References Cited

U.S. PATENT DOCUMENTS

| 5,758,028 A * | 5/1998 | Kaan ..................... G06F 9/5083 706/4 |
| 2004/0111308 A1* | 6/2004 | Yakov .................. G06Q 10/087 705/28 |
| 2007/0087756 A1* | 4/2007 | Hoffberg ............ G06Q 10/0631 455/450 |
| 2010/0082513 A1* | 4/2010 | Liu ..................... H04L 63/1458 706/46 |

OTHER PUBLICATIONS

Botzheim et al., Extracting Trapezoidal Membership Functions of a Fuzzy Rule System by Bacteria Algorithm, LNCS 2206, 2001.*
Homaifar et al., Simultaneous Design of Membership Functions and Rule Sets for Fuzzy Controllers Using Genetic Algorithms, IEEE Transactions on Fuzzy Systems, vol. 3, No. 2, May 1995.*

* cited by examiner

*Primary Examiner* — Lewis A Bullock, Jr.
*Assistant Examiner* — Kevin X Lu
(74) *Attorney, Agent, or Firm* — Che-Yang Chen; Law Offices of Scott Warmuth

(57) ABSTRACT

A method for deploying storage system resources with learning of workloads applied to a storage system is disclosed. The method utilizes state-action fuzzy rules and action-reward fuzzy rules for the storage system to learn a best dynamic deployment of resources from the parameters of workloads. No more human interference is required. It reduces work loading of the storage system administrator and enhances performance of the storage system.

15 Claims, 19 Drawing Sheets

| Scenario | Resource | +CPU | -CPU | +SSD | -SSD |
|---|---|---|---|---|---|
| Scen-1 | IOPS | + | - | X | X |
|  | Latency | X | X |  |  |
| Scen-2 | IOPS | - | + | X | X |
|  | Latency | X | X |  |  |
| Scen-3 | IOPS | + | - | X | X |
|  | Latency | X | X | - | + |
| Scen-4 | IOPS | - | + | X | X |
|  | Latency | X | X | + | - |
| Scen-5 | IOPS | X | X | + | - |
|  | Latency | + | - | X | X |
| Scen-6 | IOPS | X | X | - | + |
|  | Latency | - | + | X | X |
| Scen-7 | IOPS | + | - | X | X |
|  | Latency | X | X | + | - |
| Scen-8 | IOPS | X | X | + | - |
|  | Latency | - | + | X | X |

Fig. 5

| State-Action Fuzzy Rules | | Deviated Percentage of Latency | | |
|---|---|---|---|---|
| | | Faster (than SLA) | Neutral (Same as SLA) | Slower (than SLA) |
| Deviated Percentage of IOPS | Lower (than SLA) | (A3) Remove CPU Remove SSD | (A2) Neutral CPU Remove SSD | (A1) Add CPU Remove SSD |
| | Neural (Same as SLA) | (A6) Remove CPU Neutral SSD | (A5) Neutral CPU Neutral SSD | (A4) Add CPU Neutral SSD |
| | Higher (than SLA) | (A9) Remove CPU Add SSD | (A8) Neutral CPU Add SSD | (A7) Add CPU Add SSD |

Fig. 6

| Rule | IF Read SSD Cache | IF CPU Cores | IF Changed IOPS | IF Changed Latency | Then Reward Value |
|---|---|---|---|---|---|
| 1 | Add | Add | | | Very Low |
| 2 | Add | Neutral | | | Low |
| 3 | Add | Remove | | | High |
| 4 | Neutral | Add | | | Low |
| 5 | Neutral | Neutral | | | High |
| 6 | Neutral | Remove | | | High |
| 7 | Remove | Add | | | High |
| 8 | Remove | Neutral | | | High |
| 9 | Remove | Remove | | | Very High |
| 10 | | | Further | | Very Low |
| 11 | | | Unchanged | | Very Low |
| 12 | | | Closer | | Very High |
| 13 | | | | Further | Very Low |
| 14 | | | | Unchanged | Very Low |
| 15 | | | | Closer | Very High |

| | | Range of Deviated Percentage of Latency | | | | | |
|---|---|---|---|---|---|---|---|
| | | Below -50% | -50%~-25% | -25%~0% | 0%~25% | 25%~50% | Over 50% |
| Range of Deviated Percentage of IOPS | Below -50% | S1 | S2 | S3 | S4 | S5 | S6 |
| | -50%~-25% | S7 | S8 | S9 | S10 | S11 | S12 |
| | -25%~0% | S13 | S14 | S15 | S16 | S17 | S18 |
| | 0%~25% | S19 | S20 | S21 | S22 | S23 | S24 |
| | 25%~50% | S25 | S26 | S27 | S28 | S29 | S30 |
| | Over 50% | S31 | S32 | S33 | S34 | S35 | S36 |

Fig. 16

| Changed Amount of CPU Cores | Changed amount of Read SSD Cache | | | | | | |
|---|---|---|---|---|---|---|---|
| | Below -30% | -30%~-15% | -15%~0% | 0%~15% | 15%~30% | Over 30% |
| -4, -3 | A1 | A2 | A3 | A4 | A5 | A6 |
| -2, -1 | A7 | A8 | A9 | A10 | A11 | A12 |
| 0 | A13 | A14 | A15 | A16 | A17 | A18 |
| 1, 2 | A19 | A20 | A21 | A22 | A23 | A24 |
| 3, 4 | A25 | A26 | A27 | A28 | A29 | A30 |

Fig. 17

| Time (s) | IOPS | Latency | Deviatd Percentage of IOPS | Deviatd Percentage of Latency | Changed Amounted of Read SSD Cache | Changed Amounted of CPU Cores | ΔDeviatd Percentage of IOPS with t-1 | ΔDeviatd Percentage of Latency with t-1 | Reward Value | State Code | Action Code | Experience value |
|---|---|---|---|---|---|---|---|---|---|---|---|---|
| 0 | 3000 | 150 | -40 | -40 | 20 | -2 | | | 146 | S8 | A11 | 146 |
| 10 | 4000 | 230 | 0 | 15 | -7 | 0 | 40 | 55 | -59 | S15 | A15 | -59 |
| 20 | 3600 | 230 | -28 | -8 | -16 | 0 | -28 | -23 | -59 | S9 | A14 | -59 |
| 30 | 2800 | 230 | -30 | 15 | 19 | 0 | -2 | 23 | -17 | S15 | A17 | -158.6 |
| 40 | 4500 | 230 | -10 | -8 | | | 20 | -23 | | | | |

METHOD FOR DEPLOYING STORAGE SYSTEM RESOURCES WITH LEARNING OF WORKLOADS APPLIED THERETO

FIELD OF THE INVENTION

The present invention relates to a method for deploying storage system resources. More particularly, the present invention relates to a method for deploying storage system resources with learning of workloads applied to the storage system.

BACKGROUND OF THE INVENTION

Conventionally, there is a problem bothering administrators of storage systems. It is how to deploy "enough" resources for all workloads running over the storage system. The storage system may be used in a private network or a cloud service system. For example, if a system accessing storage resources for workloads of email service and ERP (Enterprise Resource Planning) service, a controlling server has to deploy all storage and other resources, such as CPU (Central Processing Unit) share and SSD (Solid State Disk) cache size, well enough such that when workloads applied, workable performances, e.g. IOPS (Input/Output Per Second), are acceptable. In practice, the requirement of acceptance of workload performances is written in a SLA (Service Level Agreement) for the system. If an observed performance is less than the required level in the SLA, the administrator needs to adjust the resources so that the observed performance will meet the required level soon. It may be possible that the administrator assigned permanently many resources for sudden peaks of workloads that rarely occurred to meet SLA requirement, and those resources are usually standing by, but it is a waste and few system can afford it. A smart deployment of resources must be efficient and timely.

A traditional architecture of a resource configurative storage system is illustrated in FIG. 1. The resource configurative storage system is usually operated by a controlling server 1. The controlling server 1 has many modules to conduct resource deployment. For example, the controlling server 1 may have a data analysis module 11 to detect requirements from different workloads and analyze a best configuration of resources for them. The controlling server 1 may further have a rule-base engine 12 to provide rules for the data analysis module 11, and a storage resource management module 13 to process configuration orders from the data analysis module 11. Each configuration order may have different deployment of storage resources 2 (e.g. the number of HDD, SSD and fast SSD in use), computation resource 3 (e.g. CPU share), and network resource 4 (e.g. priority in procedure). Usually, the resource configurative storage system is centralized and may have other auxiliary servers to share work loading from the controlling server 1.

There are several problems encountered by the storage system in operation. First, work loading of the single controlling server 1 usually gets heavy as workloads increase. The storage system may not have a best deployment of resources in time. Even the auxiliary servers co-work to operate the storage system, they may deal with separate groups of resources located in a different place or network. Server co-working is not an easy task. Work off-loading to other servers may not occur as expected. Heavy work loading is not healthy for the servers and may waste more resources. Second, based on different workloads applied, the administrator needs to set up different rules or policies into the rule-base engine 12 for the data analysis module 11 to follow. This job requires a seasoned administrator. Even though, exceptions are often seen, and necessary adjustment of the rules or policies must be done for smooth operation of the storage system. The key point is that the controlling server 1 is not with artificial intelligence and not able to learn how to adjust itself but requiring commands from administrators.

In order to settle the problems mentioned above, a method for deploying storage system resources with learning of workloads applied to the storage system is provided.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, the present invention provides a method for deploying storage system resources with learning of the workloads applied to a storage system. The method includes the steps of: A. setting state-action fuzzy rules for deviated percentages of parameters of a storage system from SLAs (Service Level Agreement) of workloads under specific scenarios and adjustments of resources, and action-reward fuzzy rules for adjustments of resources and reward values, wherein the scenario is a specific relation between a deviated direction of the parameters and change of a corresponding resource; B. providing an experience matrix where entries in each row refer to reward values under a specific state, and entries in each column refer to reward values for an adjustment of at least one resource, wherein the experience matrix is re-zeroed for all entries and the state is a specific combination of deviated percentages of parameters; C. collecting current deviated percentages of parameters from one of the workloads, and providing predicted deviated percentages of parameters for said workload in a plurality of later time points; D. randomly choosing one scenario and processing fuzzification, fuzzy inference, and result aggregation by inputting the collected deviated percentages of parameters of said workload to membership functions of the state-action fuzzy rules of the chosen scenario to have a first action range; E. defuzzifying the first action range to have an adjusted amount for at least one resource; F. executing the adjusted amount in the storage system for the workload; G. processing fuzzification, fuzzy inference, and result aggregation by inputting the provided predicted percentages of parameters of said workload to membership functions of the action-reward fuzzy rules to have a reward range; H. defuzzifying the reward range to have a deviated reward value; I. for the rows of the experience matrix corresponding to the states of the predicted deviated percentages of parameters, searching for the maximum value in each of rows; J. accumulating a deviated reward value and chosen values in a previous time point from the step I as an updated reward value and replacing the entry of the experience matrix under the state of the deviated percentages of parameters and action amount of the previous time point with the updated reward value; K. repeating step C to step J until each entry satisfies a converged condition, wherein the step D is processed for all workloads in turns; and L. choosing a row in the experience matrix corresponding to observed deviated percentages of parameters and executing the specific adjustment of the resources corresponding to the maximum value among the entries in the row in the storage system.

According to the present invention, the parameter may be latency, throughput, CPU (Central Processing Unit) load, memory usage, or IOPS (Input/Output Per Second). The resource may be read SSD (Solid State Disk) cache size, write SSD cache size, CPU share, RAM (Random Access Memory) size, block IO (Input/Output) bandwidth, VM (Virtual Machine) movement, or storage re-allocation. The number of states should be 4 or 5.

Preferably, the converged condition is for all entries, the reward value stays the same, or varies within a limited interval, where the interval remains the same or decreases with time, after a learning stage has passed by. The learning stage may be longer than 5 hours. A mean value between the upper and lower bounds is used to compare with other reward values in the same row to find out a maximum one for the adjustment of resource if the reward value in each entry does not keep the same with time.

The method further includes a step E1 after the step E: E1. keeping the amount of the resources and raising an alarm if an amount of the adjustment of one resource exceeds the remaining capacity of the resource.

If one action causes an amount of adjustment of one resource falls between two consequent values of adjustments of the resource, a closer value of adjustment of the resource is chosen.

According to the present invention, setting state-action fuzzy rules in the step A is obtained by the sub-steps of: defining a linguistic value for each parameter; constructing membership functions to depict degrees of all linguistic value; and constructing the state-action fuzzy rules based on the membership functions. Similarly, action-reward fuzzy rules in the step A can be obtained by the sub-steps of: defining a linguistic value for each range of changed percentage of resource, each changed percentage of parameters and each amount of reward value; constructing membership functions to depict degrees of all ranges of the deviated percentage of parameters, the adjustments of resources, and the reward values; and constructing the action-reward fuzzy rules based on the membership functions.

Preferably, a deviated reward value may be given higher if a certain amount of at least one resource is released from the workload processed in the step F. A gamma value times to each reward values before accumulating with the deviated reward value in the step J. The gamma value may range from 0 to 1.

BRIEF DESCRIPTION OF THE DRAWINGS

FIG. 5 shows all scenarios for the system.

FIG. 6 is a table showing all state-action fuzzy rules in scen-6.

FIG. 9 is a table of all action-reward fuzzy rules.

FIG. 15 shows an example of an experience matrix.
FIG. 16 indicates the states in the example.
FIG. 17 indicates the actions in the example.
FIG. 18 is an example of operation of the system.
FIG. 19 is the experience matrix after the learning stage.

DETAILED DESCRIPTION OF THE PREFERRED EMBODIMENTS

The present invention will now be described more specifically with reference to the following embodiments.

A concept of the present invention is to utilize observed and predicted deviated percentages of parameters required by several workloads applied to a storage system to find out a best deployment of resources for the workloads. After a learning stage, the storage system will know how to dynamically arrange "enough" resources for each workload as time goes by so that none of them will violate the requirement in the SLA. The learning stage is a preset time running over the storage system for learning purpose. Preferably, the learning stage should be longer than 5 hours, so that there are enough data to learn from. Waste of resources can be reduced to the lowest level. Here, the parameters refer to latency, throughput, CPU (Central Processing Unit) load, memory usage, or IOPS (Input/Output Per Second). The resources are any hardware used to meet requested parameters in the SLA. For example, the resource may be read SSD (Solid State Disk) cache size, write SSD cache size, CPU share, RAM (Random Access Memory) size, block IO (Input/Output) bandwidth, number of VM (Virtual Machines), or numbers of provisioned storage such as HDD and SSD. The workload is a service the storage system provides. For example, the email and ERP service mentioned above, video streaming, remote computation, cloud storage . . . , etc. Every workload would have a cyclic pattern with time as the clients are online using the related service, e.g. the ERP service is operated by the staffs of a factory from 8 AM Monday to 5 PM Friday every week, and maintains a monitoring function during the rest period of time. Due to the different level of data being accessed or calculated, the expressed parameters will increase or decrease as the requesting resources vary. Once the system catches the tempo of all workloads, it can automatically deploy the resources without the interference of the administrator. As long as there is no more workload applied to the system and the number of clients using the service of the workload keeps steady in a range, the system doesn't have to process the learning stage again, and the automatic deployment of resources can last.

Figure 1:
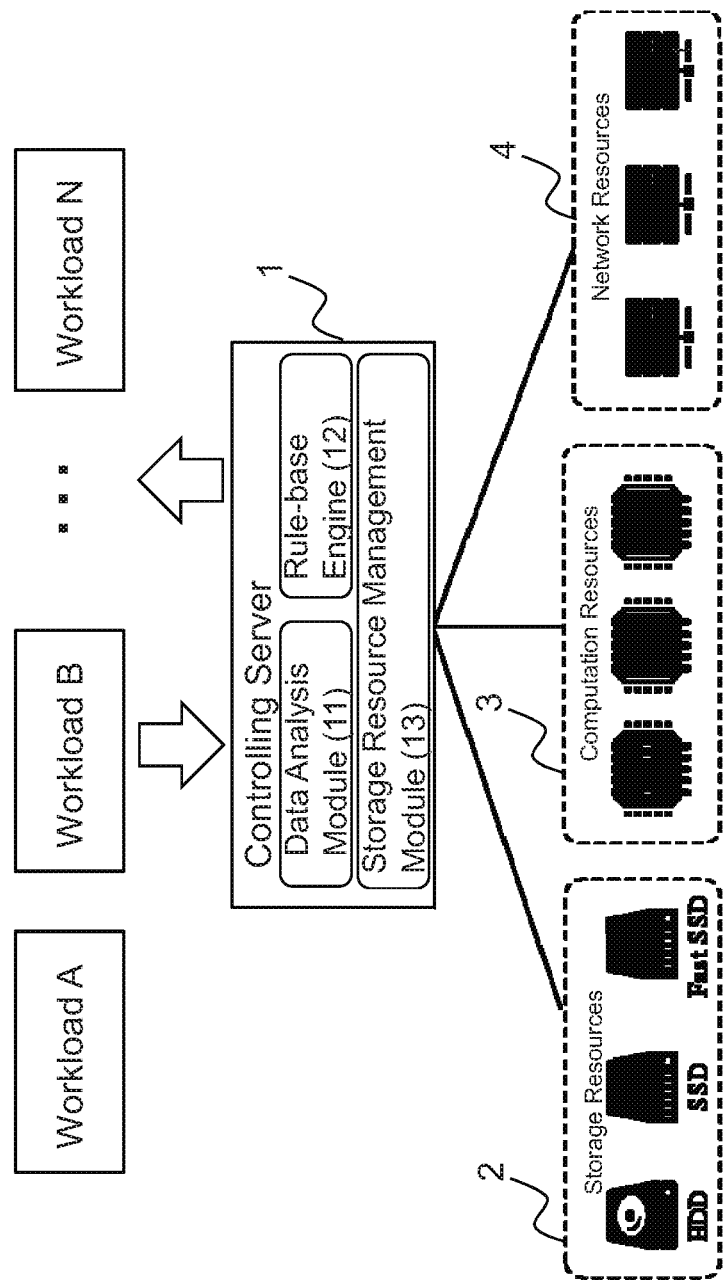
FIG. 1 is a schematic diagram of a traditional architecture of a resource configurative storage system.
Figure 2:
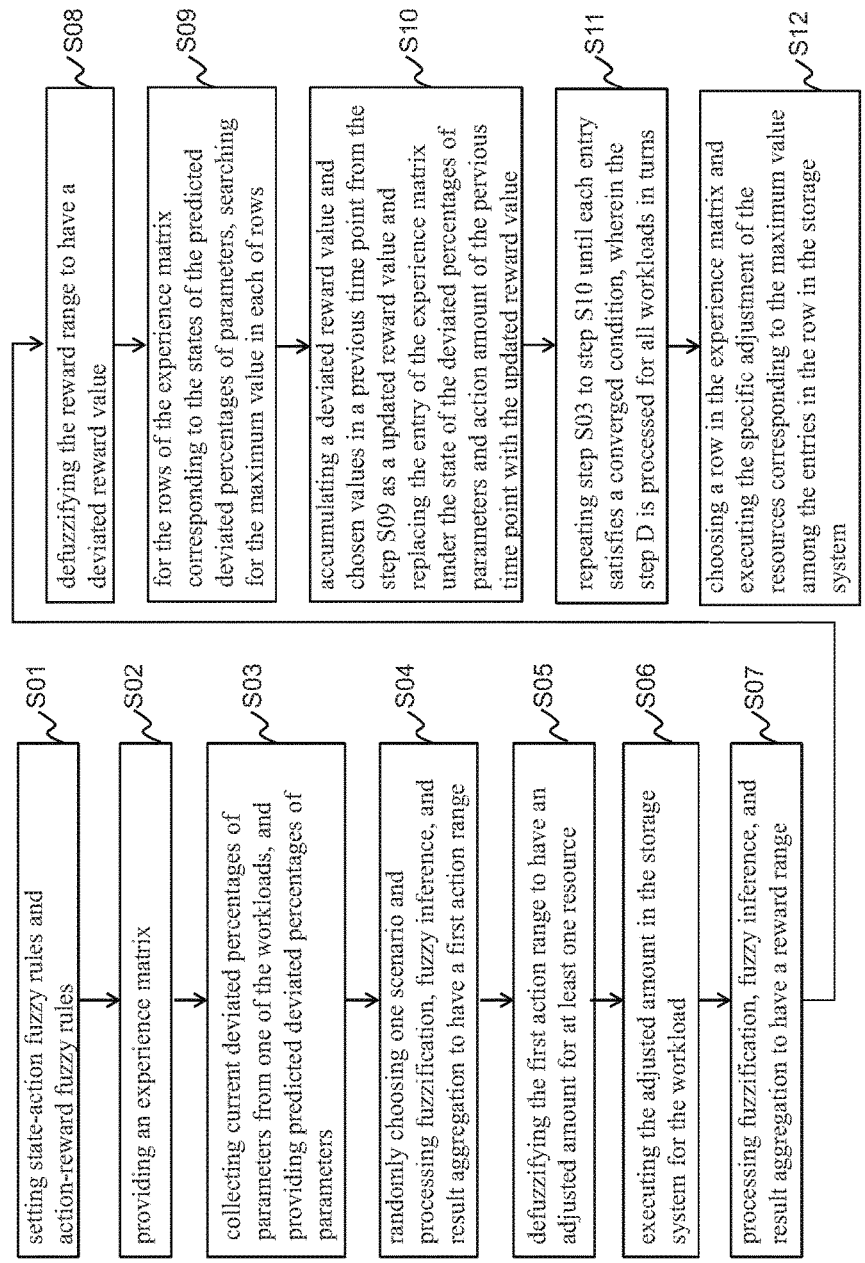
FIG. 2 is a flowchart showing steps of a method to deploy storage system resources with the learning of workloads.
Figure 3:
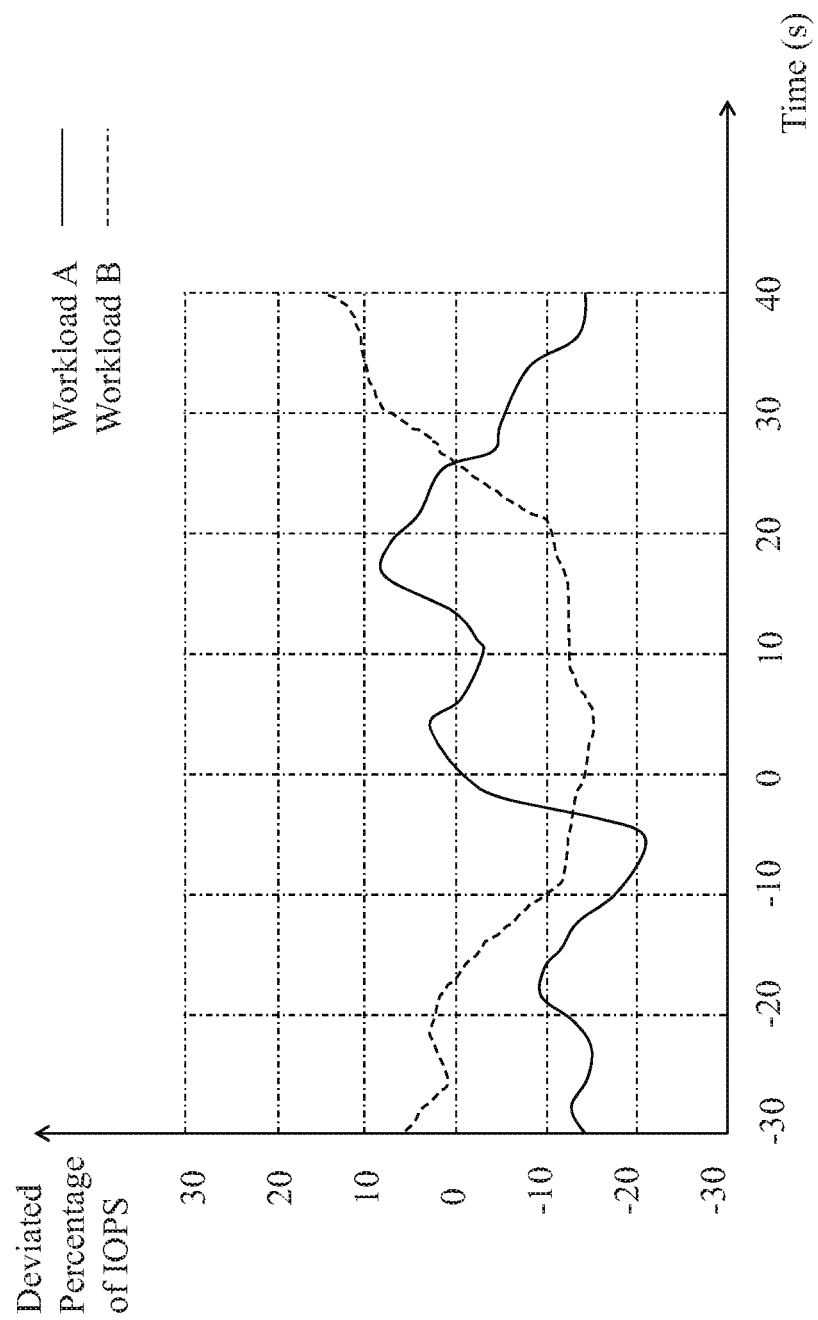
FIG. 3 shows deviated percentage of IOPS changing along with time for two workloads.

Please refer to FIG. 2. It is a flowchart showing steps of a method to deploy storage system resources with the learning of workloads. Before further illustrating the method, a scenario of application of the storage system using the present invention will be described. There are two workloads applied to the storage system. According to the spirit of the present invention, the number of the workloads is not limited as long as the capacity of the storage system can support the workloads. FIG. 3 shows an example of deviated percentages of IOPS changing along with time for the workloads, i.e. workload A and workload B. The ordinate axis denotes deviated percentage of IOPS from the requirements in separate SLAs. For each workload, its requirement for IOPS in the SLA may be different from others. However, deviated percentage of IOPS can be used to express how far the deployed resources are away from real requirement along with time. It is not "IOPS" instead. A value of IOPS for one workload may mean different state from others. The abscissa axis shows the time the deviated percentage of IOPS is observed or predicted. A "−" means a time in the past. For example, −20 is 20 seconds passed from now. A positive value of time refers to the time in the future. Since no one knows exactly what the deviated percentage of IOPS will be in the future, a reliable method for predicting such data is necessary. Any suitable methods, algorithms, or modules that provide such predictions can be applied. The data are best obtained by a storage traffic modeling system provided by the same inventor in U.S. patent application Ser. No. 14/290,533. Co-reference of the same techniques can be acquired from the application.

Figure 4:
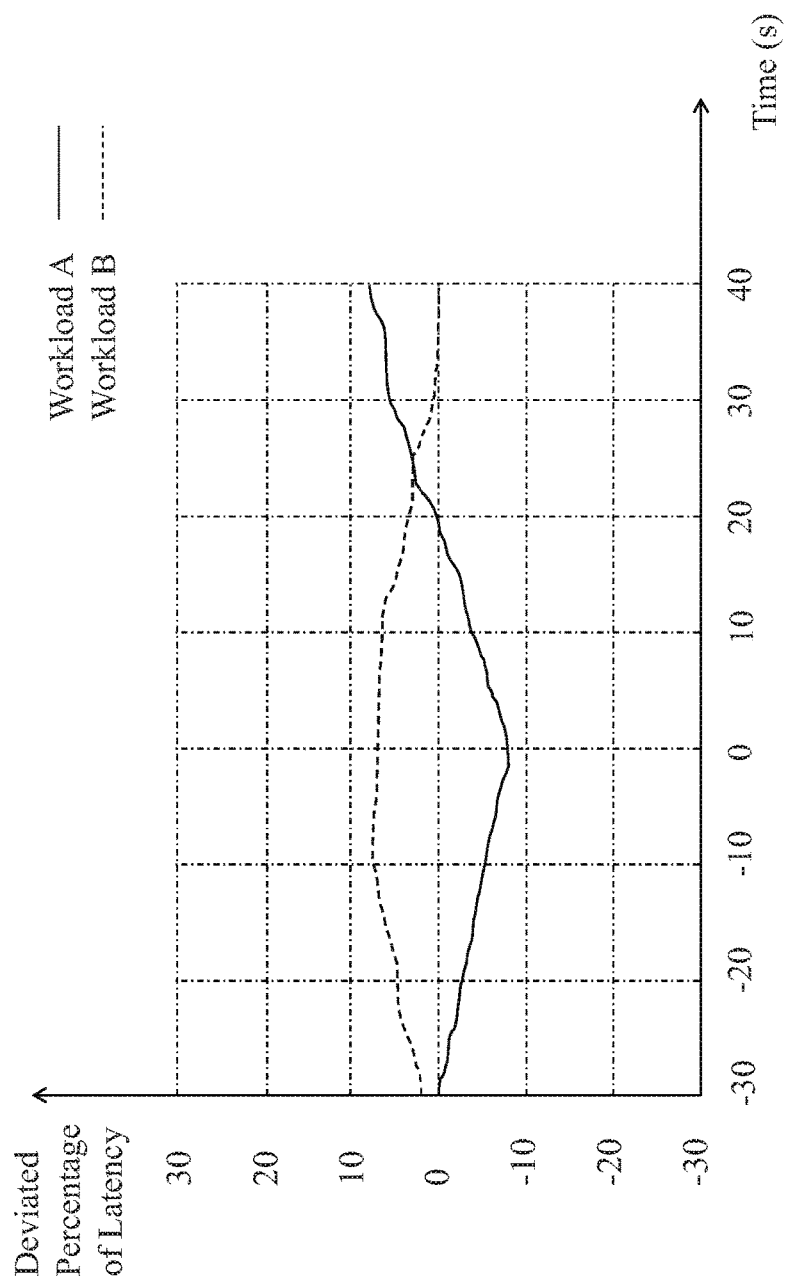
FIG. 4 shows deviated percentage of latency changing along with time for the two workloads.

According to the spirit of the present invention, the number of sorts of parameters regulated in the SLA is not limited to one. There can be more than one type of parameters used to decide the deployment of the resources of the storage. In this embodiment, a second parameter, latency, is used. Please refer to FIG. 4. FIG. 4 shows deviated percentages of latency changing along with time for the workloads. Similarly, the concept of "deviated percentage" is also suitable for latency. The deviated percentage of latency can be predicted by historical data as well. With the current and future deviated percentages of IOPS, the present invention can be implemented.

The first step of the present invention is to set state-action fuzzy rules and action-reward fuzzy rules (S01). The state-action fuzzy rules are set for deviated percentages of parameters (i.e. IOPS and latency) of the storage system from SLAs (Service Level Agreement) of workloads under specific scenarios and adjustments of resources. The action-reward fuzzy rules are set for adjustments of resources and reward values. In fact, almost all the mentioned resources allocated for the workloads affect the performance of IOPS and latency more or less. In order to simplify the description and have a comprehensive understanding for the readers, only two resources are used in the embodiments. They are read SSD cache size (%) and CPU share (cores being used). It should be emphasized that there can be more than two resources adjusted for workloads.

Here, the scenario is a specific relation between a deviated direction of the parameters and change of a corresponding resource. Please refer to FIG. 5. FIG. 5 shows all scenarios for the system. According to the combination of the resources and parameters, there are 8 scenarios ("x" refers to no effect; "+" refers to increase; "−" refers to decrease.). A fact is that when the read SSD cache size and/or CPU cores (resources) are changed to a certain degree for each workload, IOPS and latency must change. Meanwhile, it is assumed that one resource only affects the deviated direction of one specific parameter. For example, in scenario 1 (scen-1), the number of CPU cores only affects IOPS and the read SSD cache size only affects latency. Further, increase/decrease of CPU cores leads to increase/decrease of IOPS. Increase/decrease of read SSD cache size leads to increase/decrease of latency.

According to the present invention, adjustment of the resources is quantized rather than continuous. The amount of adjustment (increasing or decreasing) should be quantized. For example, the adjustment of the read SSD cache size can be 1%, 2%, 3%, 4%, 5%, or 6% more than current size, or −1%, −2%, −3%, −4%, −5%, or −6% (less than current size). There will not be intermediate values, such as 1.52%, used. This is to simplify the operation of fuzzification. Similarly, the adjustment of the CPU share can be increasing 1, 2, or 3 cores of the CPU. It can also be decreasing 1, 2, or 3 cores of the CPU in use.

According to fuzzy logic, the state-action fuzzy rules set for the deviated percentage of parameters of the storage system can be obtained by below sub-steps. First, define a linguistic value for each parameter. In this embodiment, take scen-6 for example. FIG. 6 is a table showing all state-action fuzzy rules in scen-6. If the deviated percentage of latency is positive, it means the current latency of a workload is faster than what is requested in the SLA. On the contrary, if the deviated percentage of latency is negative, it means the current latency of the workload is slower than what is requested in the SLA. "Neutral" means the deviated percentage of latency is 0. Current latency of the workload is the same as the SLA regulated. Similarly, if the deviated percentage of IOPS is positive, it means the current IOPS of the workload is higher than what is requested in the SLA. On the contrary, if the deviated percentage of IOPS is negative, it means the current IOPS of the workload is lower than what is requested in the SLA. "Neutral" means the deviated percentage of IOPS is 0. Current IOPS of the workload is the same as the SLA regulated. Faster, slower, higher, lower, and neutral are the so-called linguistic value.

Figure 7:
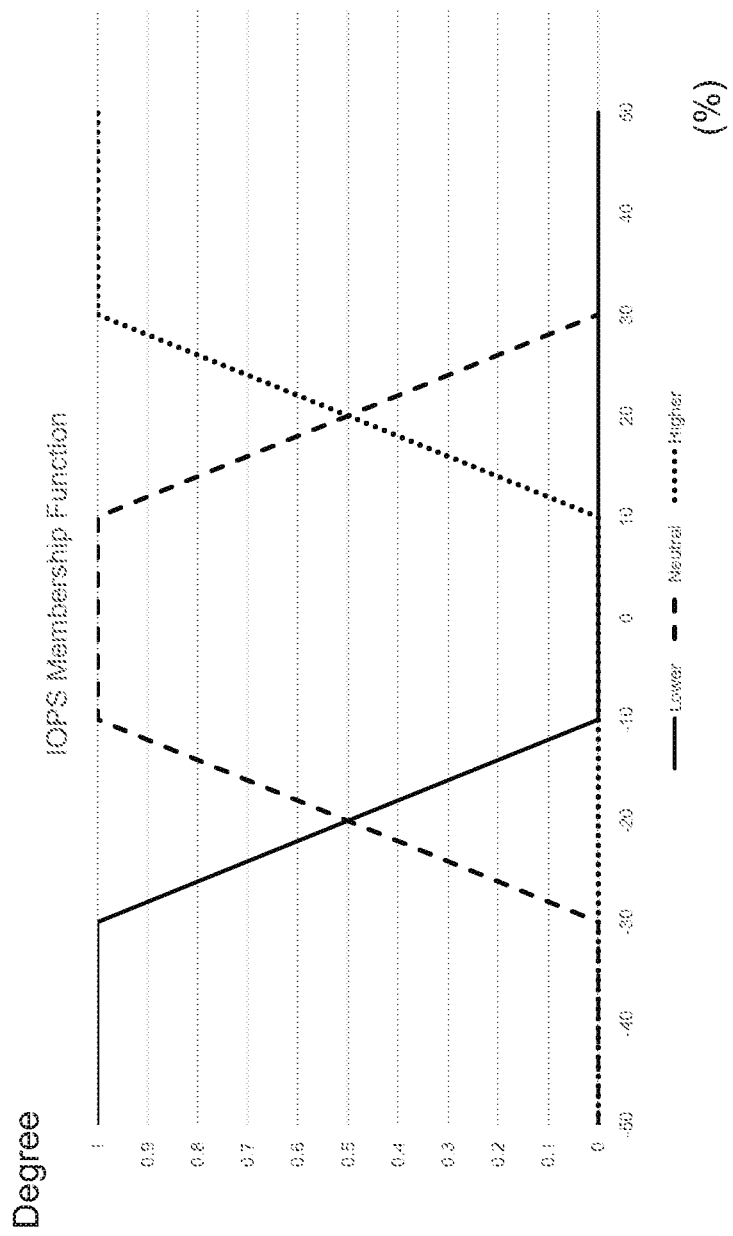
FIG. 7 shows membership functions for deviated percentages of IOPS.
Figure 8:
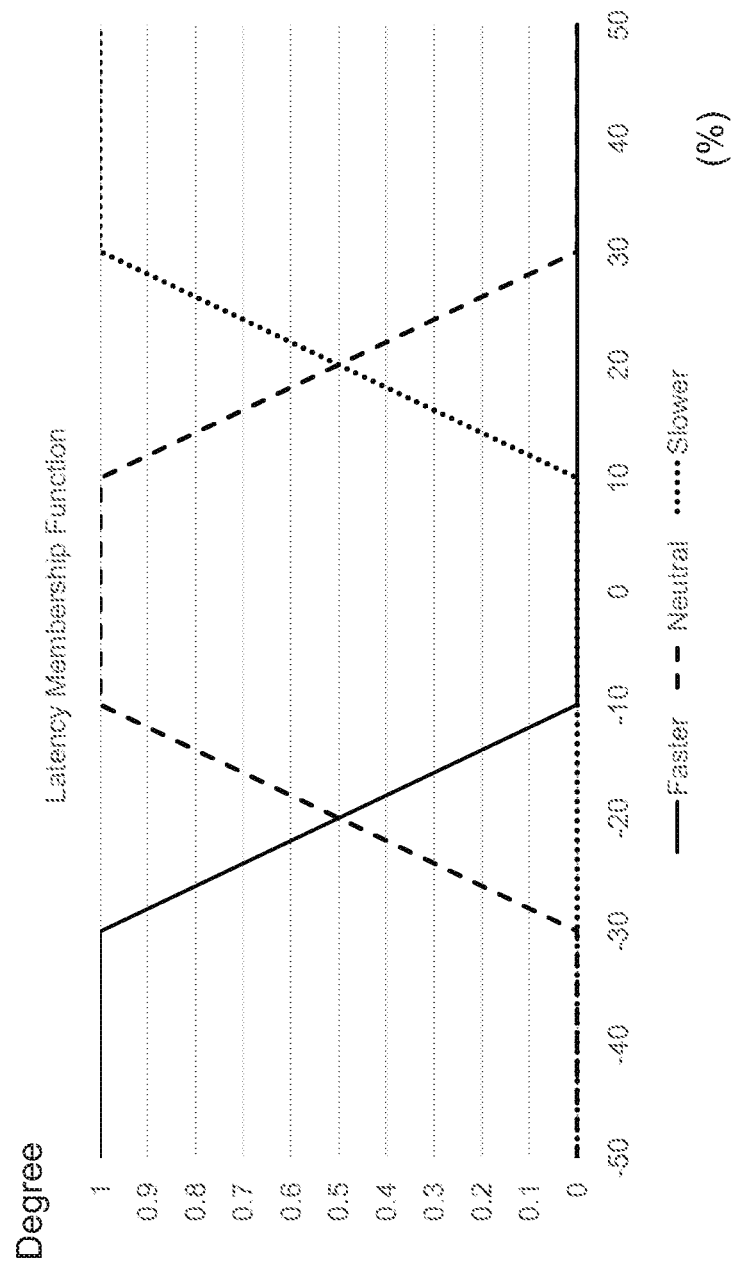
FIG. 8 shows membership functions for deviated percentages of latency.
Figure 10:
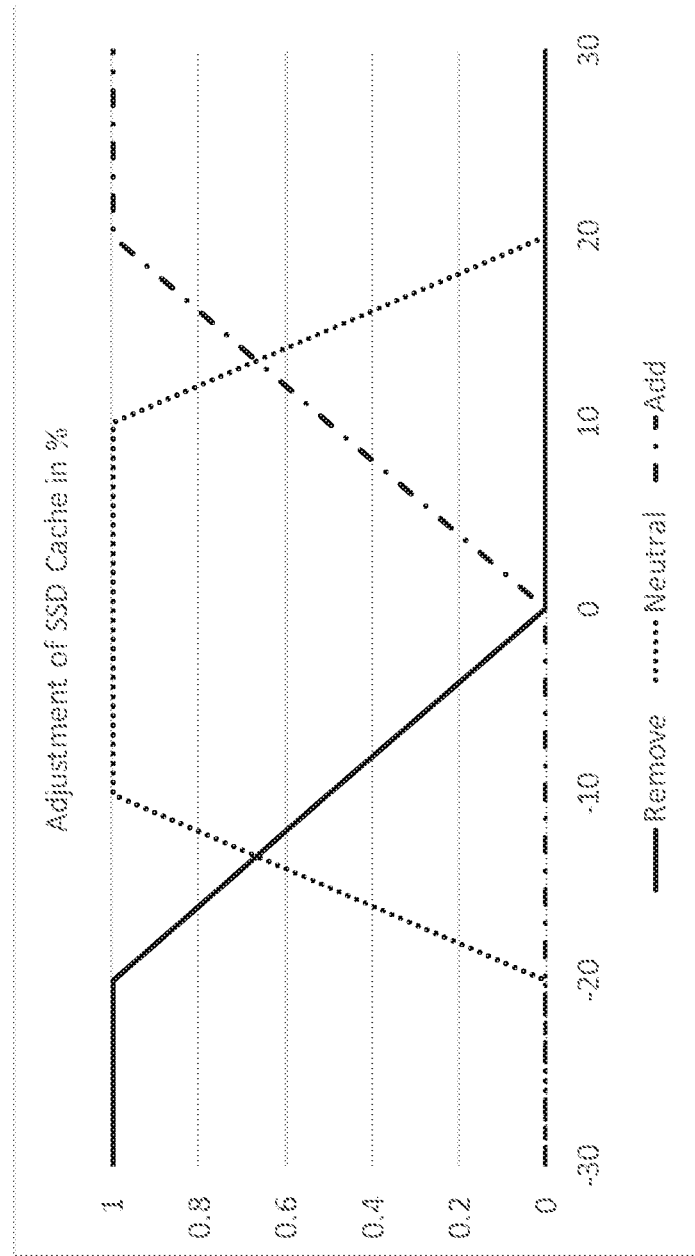
FIG. 10 to FIG. 14 illustrate membership functions for read SSD cache size, CPU cores, changed IOPS, changed latency, and reward value, respectively.
Figure 11:
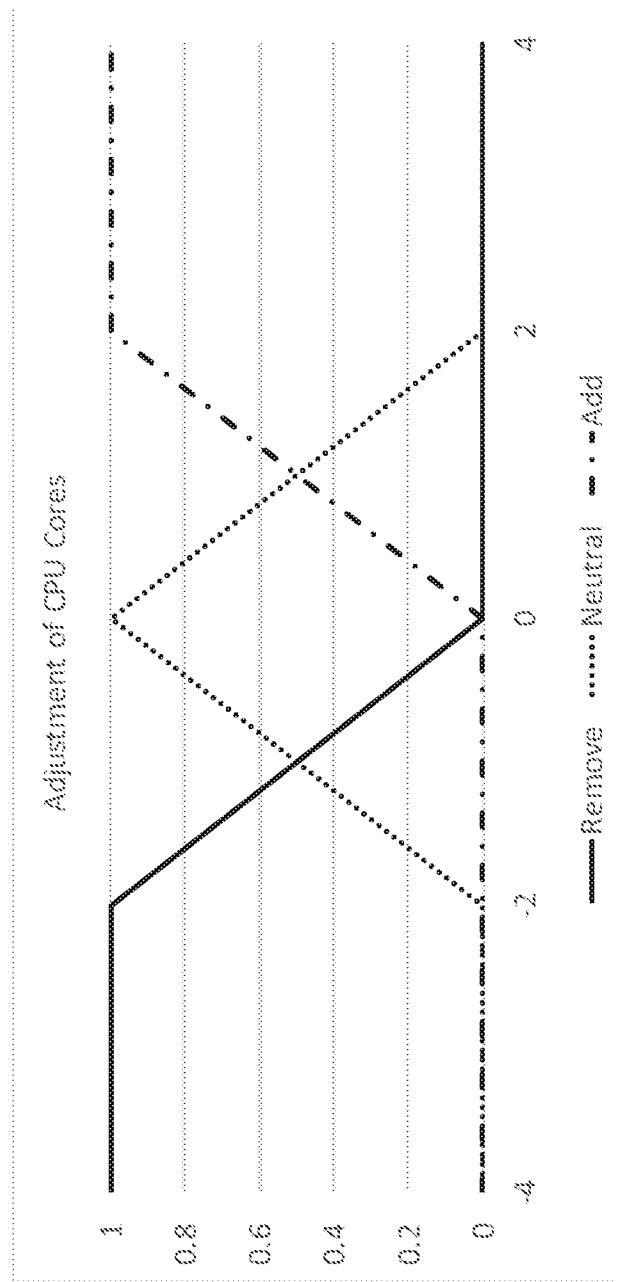
Figure 12:
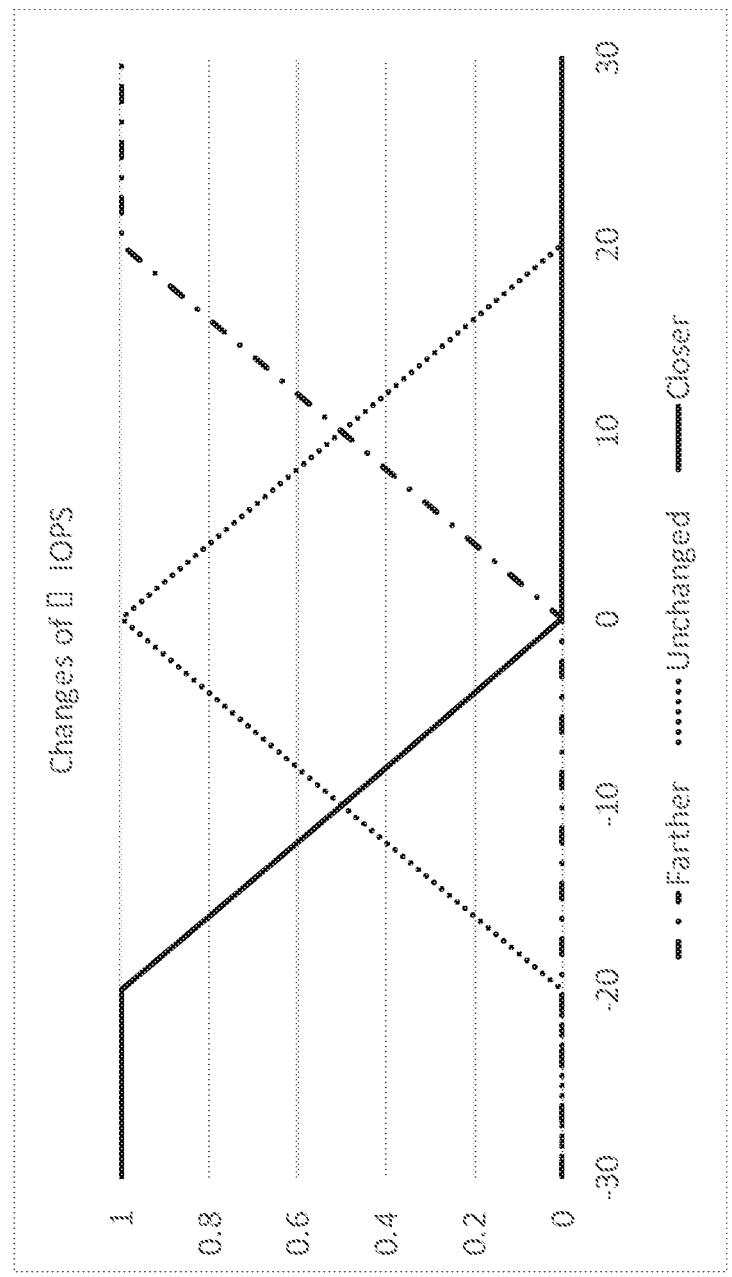
Figure 13:
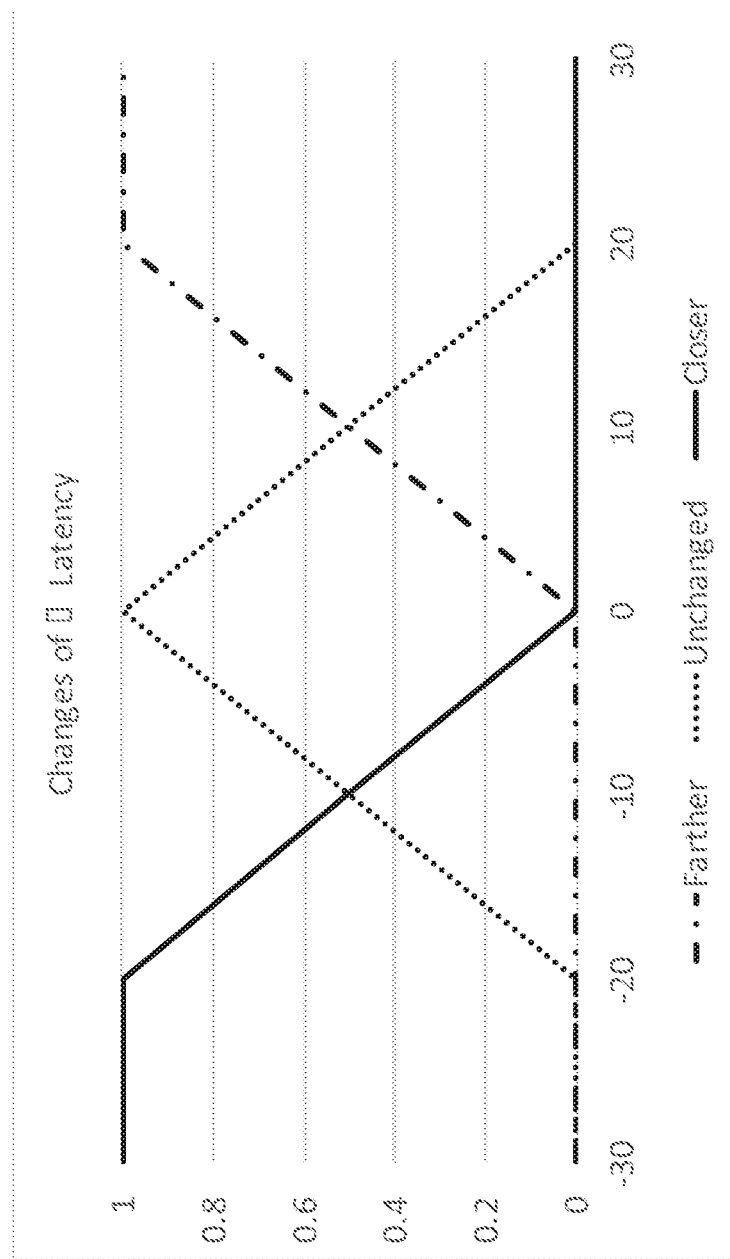
Figure 14:
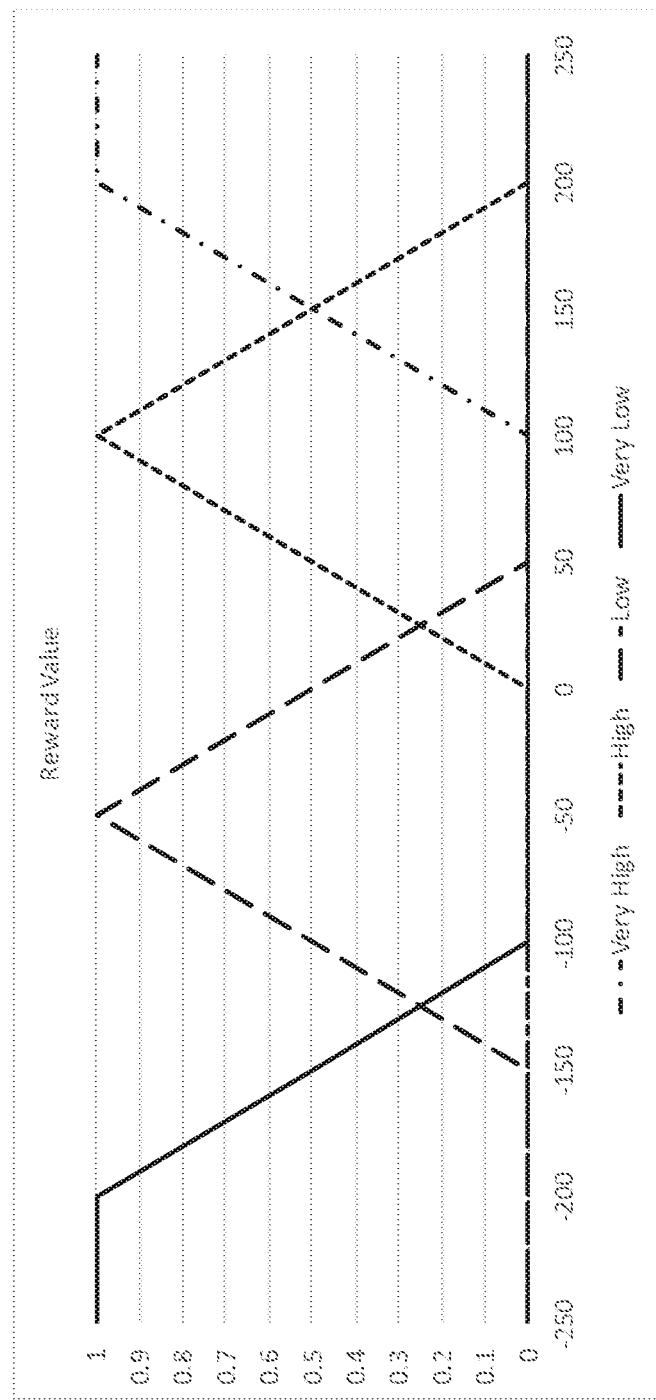

Then, the next sub-step is to construct membership functions to depicting degrees of all linguistic values. Please refer to FIG. 7 and FIG. 8. FIG. 7 shows membership functions for deviated percentages of IOPS and FIG. 8 shows membership functions for deviated percentages of latency. Degrees of the membership functions may vary for some deviated percentages of IOPS. These deviated percentages of IOPS can be deemed as multiple linguistic values. For example, degrees of IOPS between −10% and −30% can belong to lower or neutral with different amounts, and read SSD cache size and CPU cores may change under this situation. It should be noticed that although the state-action fuzzy rules may be different in all scenarios, membership functions never change. FIG. 7 and FIG. 8 are only an aspect of membership functions in the present invention. They are not shown to limit the application of membership functions. Of course, variation of the membership functions is not necessary to be linear. It may contain a curve portion.

The last sub-step is to construct the state-action fuzzy rules based on the membership functions. The state-action fuzzy rules should offer adjustments of the read SSD cache size and CPU cores. The actions shown in the grids of the table under respective deviated percentage of IOPS and latency in FIG. 6 organize the state-action fuzzy rules for scen-6. For example, the grid with A3 in the parentheses refers to a state-action fuzzy rule: if the deviated percentage of latency is faster and the deviated percentage of the IOPS is lower, then remove (a portion of) the read SSD cache size and CPU cores. The membership functions can be set according to the experience of the administrator of the storage system and historical data. The detailed in designing these membership functions are not further disclosed.

Similarly, the action-reward fuzzy rules can be obtained by below sub-steps. First, define a linguistic value for each range of changed percentage of resource, each changed percentage of parameters and each amount of reward value. The same linguistic values used for deviated percentage of parameters of resources in the state-action fuzzy rules may be inherited or newly defined. FIG. 9 is a table of all action-reward fuzzy rules. Again, add, neutral, remove, further, unchanged, closer, low, high, very low, and very high are the linguistic value for respective targets. Rule 1 to rule 9 indicate that the more resources are used, the less the reward value is granted. Rule 10 to rule 12 and rule 13 to rule 15 show the closer the IOPS and the requirement in the SLA is, the higher reward value is granted.

Then, construct membership functions to depict degrees of all ranges of the deviated percentage of parameters, the adjustments of resources, and the reward values. Please see FIG. 10 to FIG. 14. They illustrate membership functions for read SSD cache size, CPU cores, changed IOPS, changed latency, and reward value, respectively. The membership functions as well can be defined by the administrator of the storage system according to personal experiences and historical data. Finally, the action-reward fuzzy rules are constructed based on the membership functions.

Figure 15:
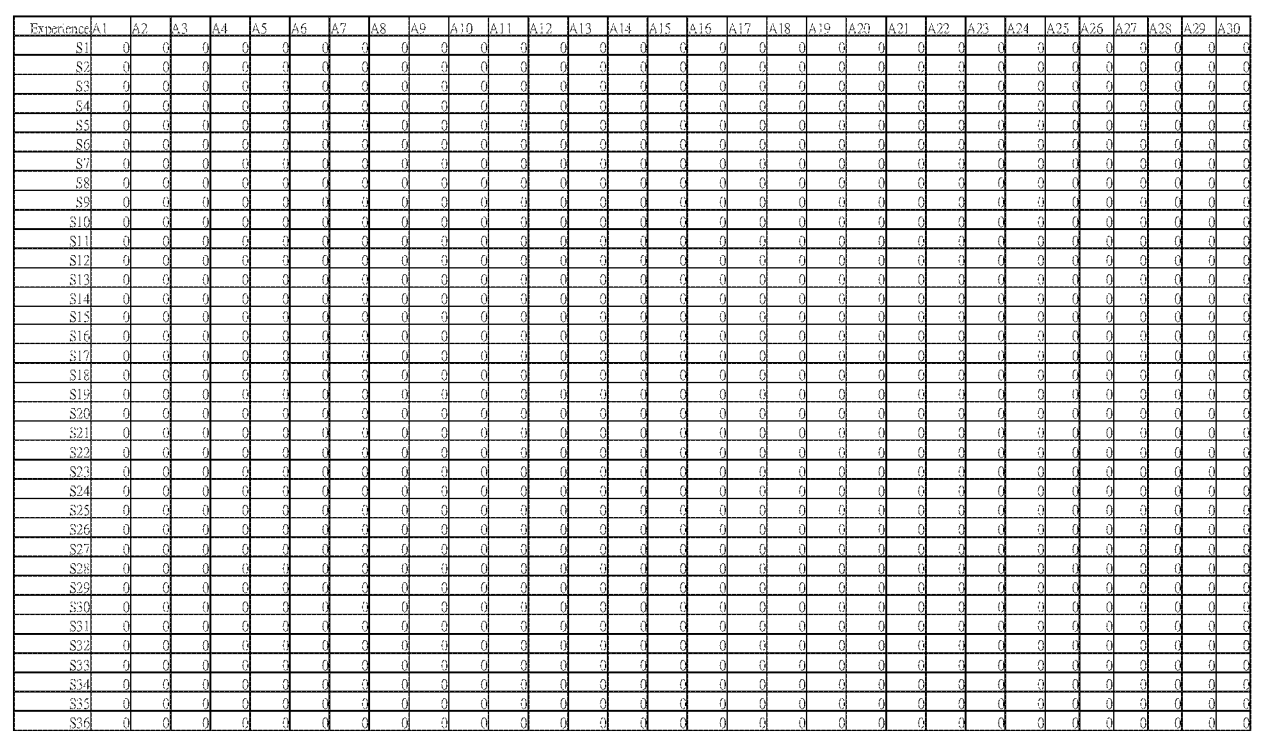

The next step of the present invention is to provide an experience matrix (S02). The experience matrix may be stored in memory or a small storage of the storage system. It can be updated with new contents and used for the storage system to learn deployment of resources. Entries in each row refer to reward values under a specific state, and entries in each column refer to reward values for an adjustment of at least one resource. Here, the state refers to a specific combination of deviated percentages of parameters, e.g. deviated 20% of IOPS and deviated −10% of latency. In the initial state of learning operation, the experience matrix is re-zeroed for all entries. An example of the experience matrix is shown in FIG. 15. The entries with "0" form the experience matrix. It should be noticed that each entry may be updated later. So, the scores in the entries are calculated by accumulating reward values in all time points. Please see FIG. 16. It indicates all possible states in the example. Each state represents a specific combination of deviated percentages of parameters. The deviated percentages of one parameter can be a fixed value or a range of values. In this example, it is a range of values. For example, state S14 comprises a range of deviated percentage of IOPS from −25% to 0 and a range of deviated percentage of latency from −50% to −25%. Please see FIG. 17. FIG. 17 indicates the actions in the example. Each action represents the changed amount of read SSD cache and CPU cores. For example, A15 is to remove 0 to 15% of read SSD cache and keep CPU cores unchanged.

Next, a step of the present invention is to collect current deviated percentages of parameters from one of the workloads (one of workload A and workload B) and provide predicted deviated percentages of parameters for that workload in a number of later time points (S03). The "time points" used in the description of the present invention refers to a condition at a specific time, including the time in the future and now. Please see FIG. 18. FIG. 18 is an example of operation of the system which will be described with following steps later. The time points are 0 s, 10 s, 20 s, 30 s, and 40 s. At 0 s, the current time, all the values of parameters are collected from observing the workload. The rest time points in the future are predicted by the real data collected in the past. How the future data are predicted has been described above. It is not to repeat it again. In practice, the number of time points in the future for predicting parameters is 4 or 5.

The idea for the storage system to learn deployment of resources is to use the deviated percentage of parameters from one workload at one time point and the predicted values to get reward values from them. The observed and predicted deviated percentage of parameters of each workload will be alternatively used for calculating in consecutive time point. Here, the example is to set requested IOPS and latency in the SLA for workload A are 5000 and 250, and for workload B are 4000 and 200. At time 0 (current), deviated percentage of parameters of workload A are collected and predicted deviated percentage of parameters of workload A are provided. Now, the IOPS is 3000 and latency is 150. Deviated percentage of IOPS and latency are −40% and −40%, respectively. The predicted deviated percentages of IOPS and latency (mentioned in pairs) in 10 s, 20 s, 30 s and 40 s in the future are (−20%, −30%), (0%, −5%), (20%, 15%), and (10%, −5%).

The next step of the present invention is randomly choosing one scenario and processing fuzzification, fuzzy inference, and result aggregation by inputting the collected deviated percentages of parameters of workload A to membership functions of the state-action fuzzy rules of the chosen scenario to have a first action range (S04). At time 0, scen-8 is chosen. State-action fuzzy rules of scen-8 are applied. Then, defuzzify the first action range to have an adjusted amount for at least one resource (S05). There are many methods for defuzzifying. The present invention doesn't limit to use any one of them. It can be chosen according to the observed operation of the system or based on the administrator's experiences. Changed amount of read SSD cache according to the calculation above is 20% increase. Changed amount of CPU cores is −2. The minimum of CPU core is 1. 20% increased read SSD cache and decreased 2 CPU cores are the adjusted amounts. Then, execute the adjusted amounts in the storage system for workload A (S06). If one action causes an amount of adjustment of one resource falls between two consequent values of adjustments of the resource, a closer value of adjustment of the resource is chosen.

Next, process fuzzification, fuzzy inference, and result aggregation by inputting the provided predicted percentages of parameters of workload A to membership functions of the action-reward fuzzy rules to have a reward range (S07). It means to input (−20%, −30%), (0%, −5%), (20%, 15%), and (10%, −5%) into the membership functions of the action-reward fuzzy rules. Following is to defuzzify the reward range to have a deviated reward value (S08). According to the spirit of the present invention, the deviated reward value will be available in a next time point (10 s). For the rows of the experience matrix corresponding to the states of the predicted deviated percentages of parameters, searching for the maximum value in each of rows (S09). For the IOPS and latency of (−20%, −30%), (0%, −5%), (20%, 15%), and (10%, −5%), the corresponding states are S14, S15, S22, and S21. In the experience matrix in FIG. 15, maximum values are 0, 0, 0, and 0, respectively (beginning state).

Then, accumulate a deviated reward value and chosen values in a previous time point from the step S09 as an updated reward value and replace the entry of the experience matrix under the state of the deviated percentages of parameters and action amount of the previous time point with the updated reward value (S10). Repeat step S03 to step S10 until each entry satisfies a converged condition (S11). The step S04 is processed for all workloads in turns. It means the first cycle of learning is based on the data of the workload A and the second cycle of learning is based on the data of the workload B. Then, the third cycle of learning is based on the data of the workload A and the fourth cycle of learning is based on the data of the workload B and so on. Currently, it is the first cycle. There is no previous time point for the step S09, the updated reward value is set to be 0 at the beginning.

At time 10 s, for workload B, the deviated percentage of IOPS is 0% and deviated percentage of latency is 15%. The predicted deviated percentage of IOPS and latency for in 20 s, 30 s, 40 s and 50 s in the future are (−10%, 15%), (10%, −5%), (20%, −30%), and (10%, −50%). They are S16, S22, S20, and S19. Repeat step S03 to S11 again with these data. The updated reward value at time 0 s is calculated to be 146. Therefore, the entry (S8, A11) of the experience matrix is updated to be 146. At time 20 s, it is back to workload A. The deviated percentage of IOPS is −28% and deviated percentage of latency is −8%. The predicted deviated percentage of IOPS and latency for in 30 s, 40 s, 50 s, and 60 s in the future are (20%, 15%), (10%, −5%), (−5%, −22%), and (−18%, −35%). They are S22, S21, S15, and S14. Repeat step S03 to S11 with these data. The updated reward value at time 10 s is calculated to be −59. It is obvious that the records are much more than what are shown in FIG. 15. The processes keep going on. As mentioned above, the processes or learning stage shall end when each entry satisfies a converged condition. The converged condition is that for all entries, the reward value stays the same, or varies within a limited interval after a learning stage has passed by. The interval may remain the same or decrease with time. For example, an entry may have the final accumulated reward value at a fixed value, e.g. 588. It may range from 563 to 607 (the interval).

Figure 19:
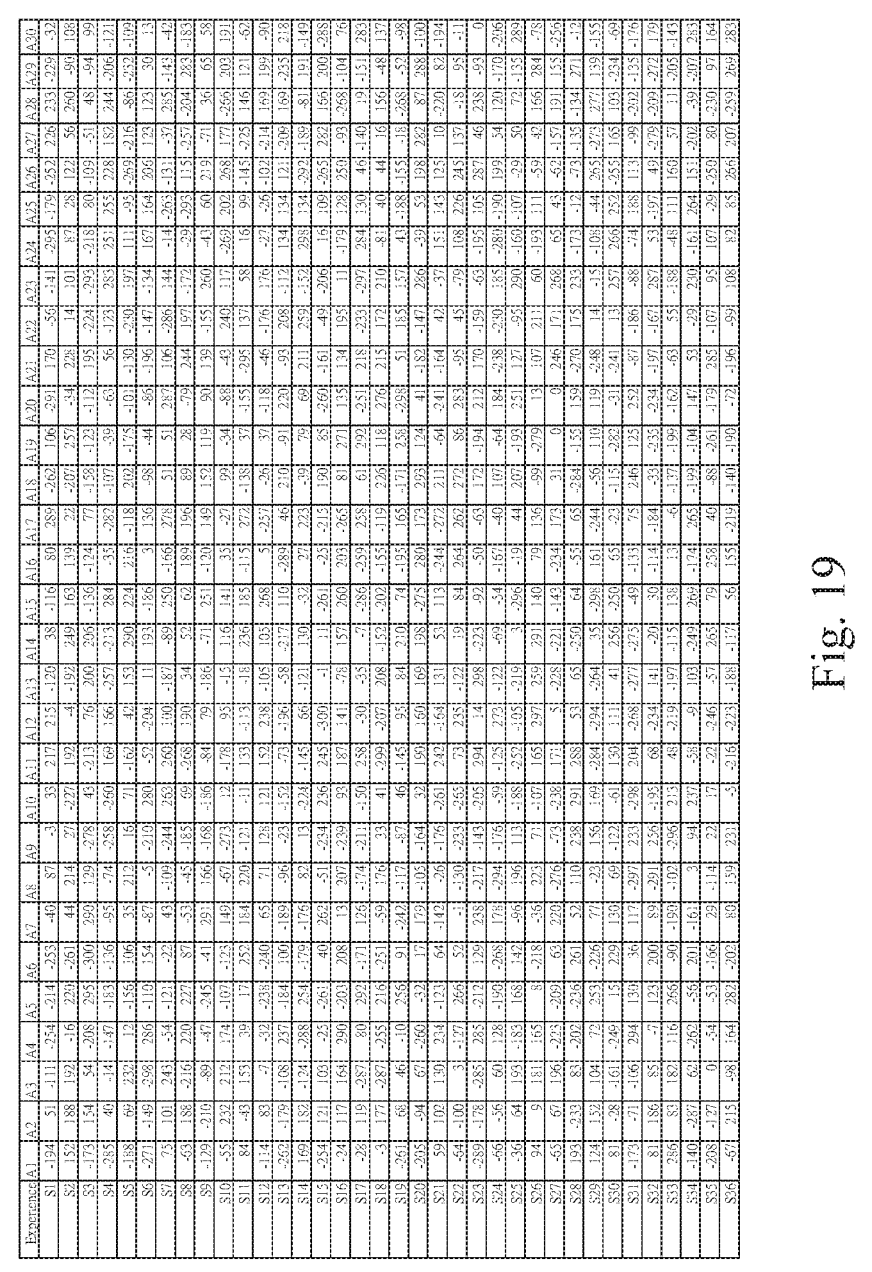

The last step in the present invention is to apply the experience matrix, after the learning stage, to the storage system by choosing a row in the experience matrix corresponding to observed deviated percentages of parameters and executing the specific adjustment of the resources corresponding to the maximum value among the entries in the row in the storage system (S12). For a better understanding, please refer to FIG. 19. FIG. 19 is the experience matrix after the learning stage. When it is applied to the system, the first step is to determine the observed deviated percentages of parameters. If the observed deviated percentages of IOPS and latency are 26% and 35%, it is S29. Just find out the maximum value in S29 (277) and execute the corresponding action (A28). Deployment of resources in the system can be automatically run by the experience matrix in FIG. 19.

In the step S10, a gamma value can be further multiplied to each chosen values before accumulated to deviated reward value. The gamma value ranges from 0 to 1. If the gamma value is closer to 0, it tends to consider immediate rewards. If the gamma value is closer to 1, it tends to consider future rewards. If the reward value in each entry does not keep the same with time, a mean value between the upper and lower bounds can be used to compare with other reward values in the same row to find out a maximum one for the adjustment of resource.

A feature of present invention is the way of giving reward values. The storage system is not independently monitoring and learning the pattern of the workloads. On the contrary, when the storage system deploys resources for one workload, it will consider requirements of other workloads in the future. If current workload the storage system processing for its data uses a resource more than it needs in the coming future, the portion can be released. For example, if workload A utilizes 3 CPU cores for operating but actually only 2 needed, the one can be reserved for workload B since it needs more calculation in the next couples of minutes. A concrete way to implement this is to give a higher deviated reward value if a certain amount of at least one resource is released from the workload processed in the step S06.

In another embodiment, the present invention can further include a step after the step S05 and before the step S06: keeping the amount of the resources and raising an alarm if an amount of the adjustment of one resource exceeds the remaining capacity of the resource. It can prevent the storage system from offering beyond its capacity. Meanwhile, the administrator can be alarmed (may be a message shown on his monitor) so that he can start to install new resources for the workloads.

The present invention utilizes state-action fuzzy rules and action-reward fuzzy rules for the storage system to learn how to deploy resources. When this method is used by a system administrator, he only has to set up the fuzzy rules and the related membership functions in the beginning. The storage system will find out a best configuration of resources for the workloads. No human interference is required after initiation of the method. Although the deployment of resources for one workload may not settle what the current workload encounters completely since the deployment is dynamically adjusted, the workload will be compensated sometime in the future. Overall, no parameters of the workloads will fall behind what is requested in the SLA. However, if the workload has been modified for its contents or new workload is operated over the storage system, the method should be applied again to have another experience matrix for use. If necessary, the fuzzy rules and the related membership functions should be reset.

As mentioned above, centralized storage systems often encounter heavy workload and more resources or servers are requested to settle this problem. The present invention is a solution to the problem with an approach of dispersed but cooperative agents. Each workload can be traced and predicted by an independent module in the storage system, e.g. hardware of or software installed in the controlling server. The modules play a role like an agent for collecting network traffic and requirements from a specific source. They are dispersed in data collection. However, when the storage system needs to make a decision for future deployment of resources, the collected data are shared (in the form of the experience matrix) and recommended data are used in turns. Each module can also learn operating experiences from others. In this way, the modules are cooperative. Thus, the present invention avoids the defect of the centralized storage system and enhances the performance for those storage systems the provided method is applied to.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for deploying storage system resources with learning of workloads applied to a storage system, comprising the steps of:

A. setting state-action fuzzy rules for deviated percentages of characteristic parameters of the storage system from SLAs (Service Level Agreement) of workloads under each scenario of a plurality of scenarios and adjustments of resources, and action-reward fuzzy rules for adjustments of resources and reward values, wherein the scenario is a specific relation between a deviated direction of the characteristic parameters and a change of a corresponding resource;

B. generating an experience matrix where entries in each row refer to reward values under a specific state, and entries in each column refer to reward values for an adjustment of at least one resource, wherein the entries in the experience matrix are initialized to zero at an initial state and changes while the reward values are updated, and the specific state is refers to a combination of deviated percentages of at least two different kinds of characteristic parameters;

C. collecting current deviated percentages of characteristic parameters from one of the workloads, and providing predicted deviated percentages of characteristic parameters for said workload in a plurality of later time points;
D. randomly choosing one scenario of a plurality of scenarios and corresponding state-action fuzzy rules and membership functions of the chosen scenario;
E. performing membership functions of the state-action fuzzy rules of the chosen scenario based on the collected deviated percentages of characteristic parameters of said workload, and performing fuzzification, fuzzy inference, and result aggregation—to the result of the membership functions to obtain a first action range;
F. defuzzifying the first action range to have an adjusted amount for at least one resource;
G. executing the adjusted amount in the storage system for the workload;
H. processing fuzzification, fuzzy inference, and result aggregation by inputting the provided predicted percentages of characteristic parameters of said workload to chosen scenario's membership functions of the action-reward fuzzy rules to have a reward range;
I. defuzzifying the reward range to have a deviated reward value;
J. for the rows of the experience matrix corresponding to the states of the predicted deviated percentages of characteristic parameters, searching for the maximum value in each of the rows;
K. accumulating a deviated reward value and chosen values in a previous time point from the step I as an updated reward value and replacing the entry of the experience matrix under the state of the deviated percentages of parameters and action amount of the previous time point—with the updated reward value, wherein the chosen values are the maximum values in each of the rows obtained from the step I of the previous cycle of step C to step K;
L. repeating step C to step K until each of the reward value stays the same or varies within a limited interval over time, wherein workloads that are not selected to be processed in step C are further processed in turns while step C to step K are repeated;
M. choosing a row in the experience matrix corresponding to observed deviated percentages of characteristic parameters; and
N. executing the specific adjustment of the resources corresponding to the maximum value among the entries in the row in the storage system.

2. The method according to claim 1, wherein if there is no previous time point for the step I, the updated reward value is set to be 0.

3. The method according to claim 1, wherein the characteristic parameter comprises latency, throughput, CPU (Central Processing Unit) load, memory usage, or IOPS (Input/Output Per Second).

4. The method according to claim 1, wherein the resource comprises read SSD (Solid State Disk) cache size, write SSD cache size, CPU share, RAM (Random Access Memory) size, block IO (Input/Output) bandwidth, number of VM (Virtual Machine), or number of provisioned storage.

5. The method according to claim 1, wherein the number of time points is 4 or 5.

6. The method according to claim 1, wherein the limited interval remains the same or decreases with time, after a learning stage has passed by.

7. The method according to claim 6, wherein the learning stage is longer than 5 hours.

8. The method according to claim 6, wherein a mean value between the upper and lower bounds of the reward values which varies within the limited interval is calculated and compared with other reward values in the same row to obtain a maximum one for the adjustment of resource if the reward value in each entry does not keep the same with time.

9. The method according to claim 1, further comprising a step F1 after the step F: F1. keeping the amount of the resources and raising an alarm if an amount of the adjustment of one resource exceeds the remaining capacity of the resource.

10. The method according to claim 1, wherein a closer value of adjustment of the resource is chosen if one action causes an amount of adjustment of one resource falls between two consequent values of adjustments of the resource.

11. The method according to claim 1, wherein setting state-action fuzzy rules in the step A is obtained by the sub-steps of:
defining a linguistic value for each characteristic parameter;
constructing membership functions to depict degrees of all linguistic value; and
constructing the state-action fuzzy rules based on the membership functions.

12. The method according to claim 1, wherein action-reward fuzzy rules in the step A is obtained by the sub-steps of:
defining a linguistic value for each range of changed percentage of resource, each changed percentage of characteristic parameters and each amount of reward value;
constructing membership functions to depict degrees of all ranges of the deviated percentage of characteristic parameters, the adjustments of resources, and the reward values; and
constructing the action-reward fuzzy rules based on the membership functions.

13. The method according to claim 1, wherein the deviated reward value is given higher if a certain amount of at least one resource is released from the workload processed in the step G.

14. The method according to claim 1, wherein a gamma value times to each reward values before accumulating with the deviated reward value in the step J.

15. The method according to claim 14, wherein the gamma value ranges from 0 to 1.

* * * * *